US010054477B2

(12) United States Patent
Gagas et al.

(10) Patent No.: US 10,054,477 B2
(45) Date of Patent: Aug. 21, 2018

(54) WEIGHT-MEASURING SYSTEM FOR UTILITY VEHICLE (71) Applicant: Excel Industries, Inc., Hesston, KS (US)

(72) Inventors: John Michael Gagas, Milwaukee, WI (US); Larry Golladay, Wichita, KS (US); Hassan Ali Alabdulsalam, Wichita, KS (US); Abdulaziz Essa Aldossary, Wichita, KS (US); Nhat Tran, Wichita, KS (US); Huong Thu Nguyen, Wichita, KS (US); Omar Abdullah Alsaiari, Wichita, KS (US); Salem Hamadah Alarnoos, Wichita, KS (US)

(73) Assignee: Excel Industries, Inc., Hesston, KS (US)

( * ) Notice: Subject to any disclaimer, the term of this patent is extended or adjusted under 35 U.S.C. 154(b) by 170 days.

(21) Appl. No.: 15/135,078

(22) Filed: Apr. 21, 2016

(65) Prior Publication Data
US 2016/0327425 A1    Nov. 10, 2016

Related U.S. Application Data (60) Provisional application No. 62/158,417, filed on May 7, 2015.

(51) Int. Cl.
*G01G 19/12* (2006.01)
*G01C 9/06* (2006.01)
*G01G 19/08* (2006.01)

(52) U.S. Cl.
CPC ............... *G01G 19/12* (2013.01); *G01C 9/06* (2013.01); *G01G 19/083* (2013.01)

(58) Field of Classification Search
CPC ........ G01G 19/08; G01G 19/10; G01G 19/12; G01G 19/083; G01C 9/06
See application file for complete search history.

(56) References Cited

U.S. PATENT DOCUMENTS

| 2,109,460 A | * | 3/1938 | Brasher | G01G 19/10 |
| | | | | 177/139 |
| 2,756,983 A | * | 7/1956 | Furcini | G01G 5/04 |
| | | | | 177/139 |
| 3,321,035 A | * | 5/1967 | Tarpley | G01G 3/1408 |
| | | | | 177/136 |
| 4,606,419 A | * | 8/1986 | Perini | G01G 19/10 |
| | | | | 177/138 |
| 4,706,768 A | * | 11/1987 | Kozozian | G01G 19/12 |
| | | | | 177/138 |
| 4,905,780 A | * | 3/1990 | Goff, III | G01G 17/08 |
| | | | | 177/136 |

(Continued)

*Primary Examiner* — Randy Gibson
(74) *Attorney, Agent, or Firm* — Shook, Hardy & Bacon, LLP (57) ABSTRACT A weight-measuring system for measuring a weight amount of one or more items loaded into a bed of a vehicle is provided. The weight amount can be used to determine whether a weight limit has been exceeded and whether some additional action should be taken. In addition, one type of weight-measuring system is operable under varied conditions, such as rapid weight fluctuations, and is capable of measuring a weight amount when the bed is in various positions (e.g., transporting mode or ground-level, loading mode).

13 Claims, 5 Drawing Sheets (56) References Cited

U.S. PATENT DOCUMENTS

| | | | | |
|---|---|---|---|---|
| 5,161,628 | A * | 11/1992 | Wirth | G01G 19/08 |
| | | | | 177/137 |
| 5,369,222 | A * | 11/1994 | Strelioff | G01G 19/10 |
| | | | | 177/136 |
| 5,393,936 | A * | 2/1995 | Tyhy | G01G 19/12 |
| | | | | 177/138 |
| 5,578,798 | A * | 11/1996 | Nuyts | G01G 19/12 |
| | | | | 177/136 |
| 5,635,680 | A * | 6/1997 | Dojan | G01G 19/08 |
| | | | | 177/136 |
| 5,717,167 | A * | 2/1998 | Filing | G01G 19/08 |
| | | | | 177/136 |
| 6,150,617 | A * | 11/2000 | Hart | A01B 79/005 |
| | | | | 177/136 |
| 6,384,349 | B1 * | 5/2002 | Voll | G01G 19/10 |
| | | | | 177/137 |
| 6,560,561 | B1 * | 5/2003 | Foster | G01G 19/08 |
| | | | | 171/141 |
| 7,009,118 | B2 * | 3/2006 | Pottebaum | G01G 19/12 |
| | | | | 177/136 |
| 7,196,276 | B1 * | 3/2007 | Cope | G01G 19/083 |
| | | | | 177/116 |
| 7,735,365 | B2 * | 6/2010 | Crain | G01G 17/04 |
| | | | | 141/83 |
| 8,674,243 | B2 * | 3/2014 | Curotto | G06Q 10/30 |
| | | | | 177/136 |
| 8,716,609 | B2 * | 5/2014 | Pangrazio | G01G 19/08 |
| | | | | 177/136 |
| 2007/0181350 | A1 * | 8/2007 | Kranz | G01G 19/08 |
| | | | | 177/136 |

* cited by examiner

WEIGHT-MEASURING SYSTEM FOR UTILITY VEHICLE

This application claims the benefit of U.S. Provisional Application No. 62/158,417, filed May 7, 2015, and entitled "Weight-Measuring System For Vehicle." The entirety of the aforementioned application is incorporated by reference herein.

FIELD

Aspects relate to a system for measuring a weight amount of contents loaded into a bed of a vehicle.

BACKGROUND

Some types of vehicles (e.g., pickup trucks, moving trucks, utility vehicles—UTVs, and the like) include a bed (e.g., cargo bed) for transporting items, and often a vehicle includes a load-capacity rating, which suggests a maximum weight amount of items loaded in the bed. But it can be challenging to determine the weight of the items loaded in the bed and how the weight amount compares to the load-capacity rating.

SUMMARY

An aspect hereof is directed to a weight-measuring system for measuring a weight amount of one or more items loaded into a bed of a vehicle. Generally, the system includes one or more sensors, such as weight sensors and a tilt sensor, which provide outputs used to determine a weight amount. The weight amount can be displayed to the operator or can be used to determine whether a weight threshold has been exceeded and whether some additional action should be taken, such as providing an alert or disabling an operation of the vehicle. In other aspects, the system is operable under varied conditions, such as rapid weight fluctuations, and is capable of measuring a weight amount when the bed is in various positions (e.g., transporting mode or ground-level, loading mode).

Embodiments of the invention are defined by the claims below, not this summary. A high-level overview of various aspects of the invention is provided here to introduce a selection of concepts that are further described below in the detailed-description section below. This summary is not intended to identify key features or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different elements or combinations of elements similar to the ones described in this document, in conjunction with other present or future technologies.

This technology is generally directed to a weight-measuring system for measuring a weight amount of one or more items loaded into a bed of a vehicle. For example, referring to FIG. 1, an illustrative vehicle 10 is depicted having a cab or seating area 12, as well as a bed 14 (e.g., cargo bed). Although a UTV is described in various aspects of this invention, the weight-measuring system could be utilized with a variety of different types of vehicles having beds or other styles of cargo-storage areas. For example, the weight-measuring system could be utilized with off-road vehicles, construction vehicles, sports and recreation vehicles, golf carts, and the like.

Figures 1, 4:
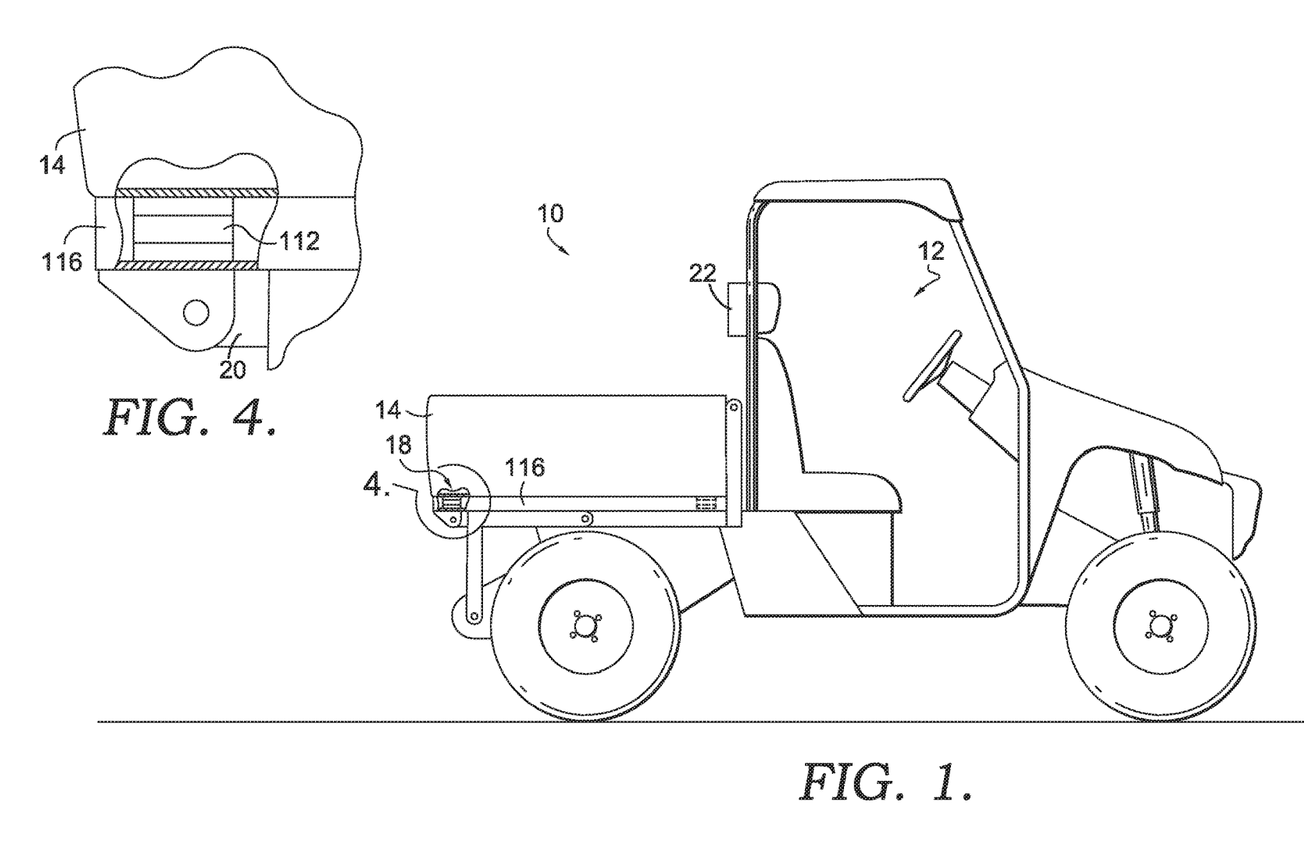
FIG. 1 depicts a vehicle with a cargo bed in a transporting position in accordance with an embodiment of the present invention.
FIG. 4 depicts an enlarged view of a cutout shown in FIG. 1 in accordance with an embodiment of the present invention.

The vehicle 10 might have various capabilities, such as the ability to navigate both on-road and off-road and at relatively high speeds (e.g., up to and exceeding 60 mph), as well as the ability to transition the bed 14 into various positions (e.g., transportation mode, dump mode, and ground-level, loading mode). A weight-measuring system, in accordance herewith, is constructed to operate under these various conditions, including withstanding significant weight fluctuations due to jarring, detecting weight measurement in multiple bed positions, and accounting for system tilt when the vehicle or bed is on uneven terrain.

Figure 2:
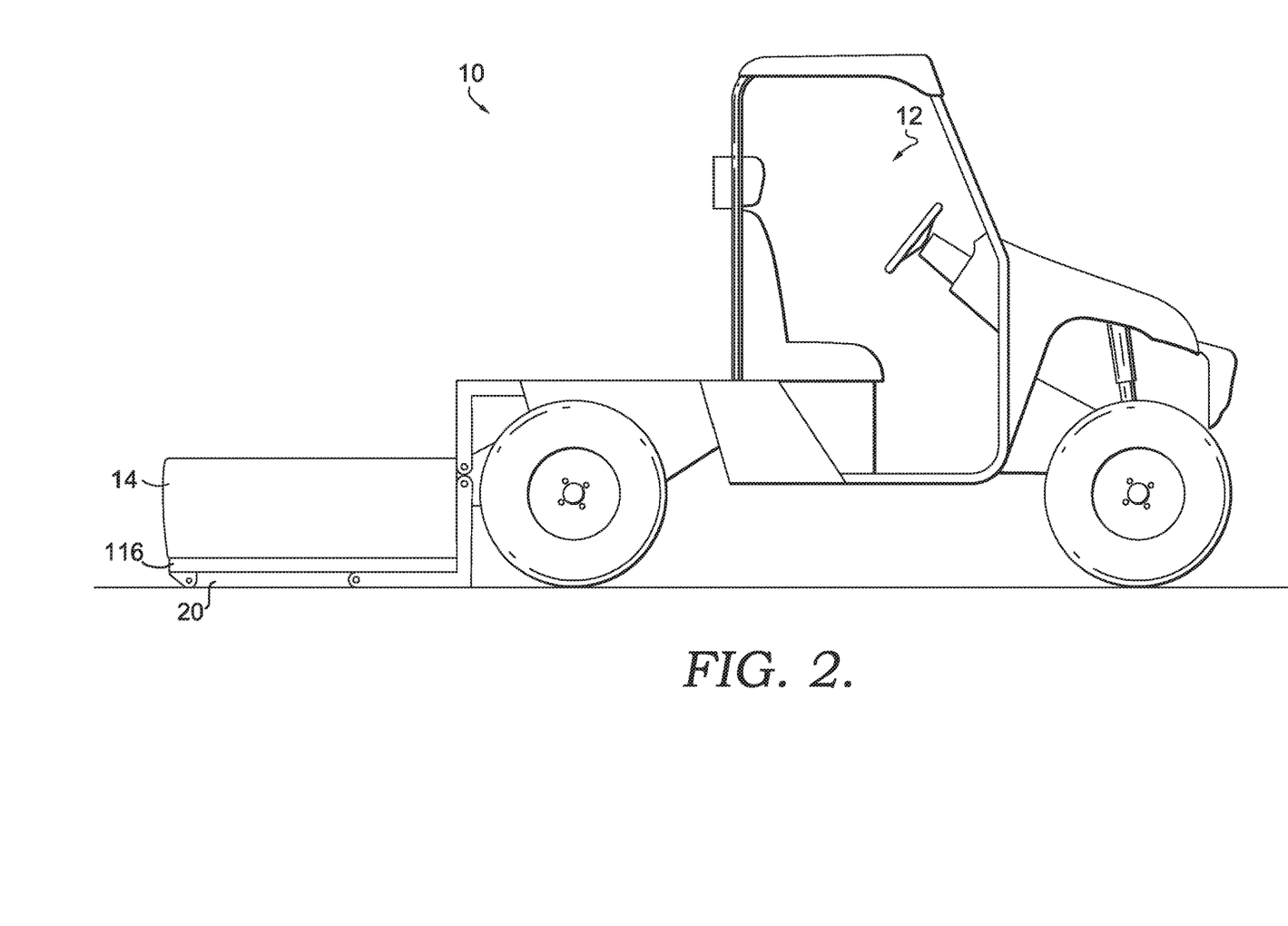
FIG. 2 depicts the vehicle of FIG. 1, with the bed in a loading position in accordance with an embodiment of the present invention.

To further illustrate aspects of the present invention, reference is made to FIGS. 1 and 2, in which the vehicle 10 might have components providing a dump-style bed and/or a translating bed. A translating bed includes various positions, including a transporting position (as depicted in FIG. 1), a loading position (e.g. ground level as depicted in FIG. 2), as well as a dump position achieved by maneuvering the bed to a position between the transporting position and the loading position. Exemplary components that provide for a translating bed are described in U.S. Pat. No. 8,157,316, which is incorporated herein by reference in its entirety. A weight-measurement system in accordance herewith is operable to measure a weight amount of items loaded into the bed 14 when the bed is in the transportation position (FIG. 1) and when the bed 14 is in the ground-level, loading position (FIG. 2).

Figure 5:
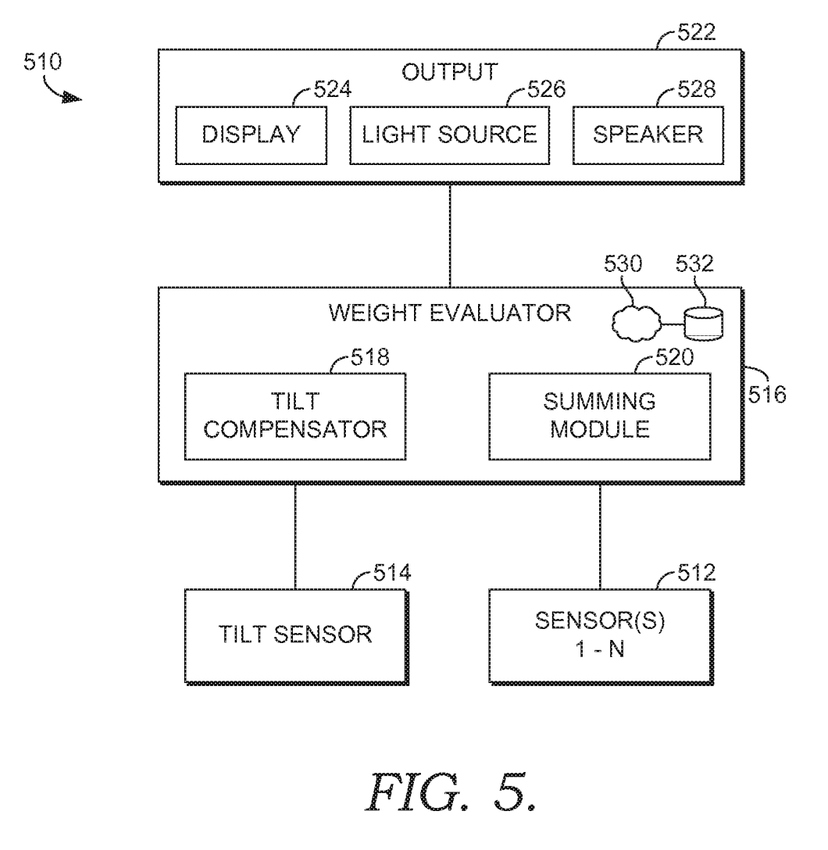
FIG. 5 provides a schematic diagram of components that are networked or electronically connected as part of a weight-measuring system in accordance with an embodiment of the present invention.

Having generally described some aspects hereof, the weight-measuring system will be described in greater detail with respect to FIG. 5, which depicts a schematic diagram of an exemplary weight-measuring system 510 having various components. In FIG. 5, the weight-measuring system 510 includes one or more weight sensors 512 and a tilt sensor 514. In addition, the weight-measuring system 510 includes a weight evaluator 516, which includes a tilt compensator 518 and, in one embodiment, includes a summing module 520. The weight-measuring system 510 may further include an output device 522, such as a display 524, a light source 526 (e.g., LED), and a speaker 528.

Although not explicitly illustrated in FIG. 5, the weight-measuring system 510 of FIG. 5 might include other components as well, such as additional computing hardware, cables, control means, and the like. Further, although FIG. 5 depicts some components as being combined, this is merely for explanatory purposes, and in other aspects, components or functions that are combined in FIG. 5 might be discrete. For instance, the tilt compensator 518 and the summing module 520 are conceptually combined under the weight evaluator 516, but these components might be entirely separate components, both in a physical sense and in a virtual sense. In addition, the output device 522 and the weight evaluator 516 are depicted as separate components that communicate with one another, but these components might be combined in various manners, such as by being housed under the same computing device (e.g., indicator module). Also, although only one of a particular component might be depicted in FIG. 5, the weight-measuring system might include more than a single one of the respective component.

In the weight-measuring system, the one or more weight sensors 512 might include one or more various types of sensors configured to detect movement, pressure changes, and the like, such as transducers, hall chips, pressure sensors, dynamic devices, capacitive load cells, strain and force, pressure switches, displacement and proximity, linear voltage output resistor network, load cells, linear potentiometers, force sensors, and torque transducers, and the like. More particularly, one type of sensor is a load-cell design, which can be distinguished according to the type of output signal generated (pneumatic, hydraulic, and electric) or according to the way they detect weight (bending, shear, compression, tension, etc.).

In one aspect, the sensor(s) 512 include(s) hydraulic load cells, which are force-balance devices, measuring weight as a change in pressure of the internal filling fluid. In a rolling-diaphragm-type hydraulic load cell, a load or force acting on a loading head is transferred to a piston that in turn compresses a filling fluid confined within an elastomeric diaphragm chamber. As force increases, the pressure of the hydraulic fluid rises. This pressure can be locally indicated or transmitted for remote indication or control. Output is linear and relatively unaffected by the amount of the filling fluid or by its temperature. If the load cells have been properly installed and calibrated, accuracy is acceptable for most process-weighing applications. Further, because this type of sensor has limited electric components, it is often used in areas exposed to component-disrupting environmental conditions (e.g., moisture, heat, dirt, light, and the like).

In another aspect, the sensor(s) 512 include(s) pneumatic load cells, which also operate on a force-balance principle. These devices use multiple dampener chambers, which can sometimes result in better accuracy than a hydraulic device. In some designs, the first dampener chamber is used as a tare weight chamber. One advantage of this type of load cell includes a lower sensitivity to temperature variations. Additionally, they contain limited to no fluids that might contaminate the process if the diaphragm ruptures.

In a further aspect, the sensor(s) 512 include(s) strain-gauge load cells that convert the load acting on them into electrical signals. That is, the gauges themselves include components that deform when weight is applied. When weight is applied, the strain changes the electrical resistance of the gauges in proportion to the load. As previously indicated, the sensor(s) 512 might include one sensor type or a combination of different sensor types.

In one aspect of the present invention, the sensor(s) 512 include a weight-measuring capacity that is about five times the bed-load capacity. For example, if the bed 14 includes a load capacity of about 2,000 lb., then the sensor(s) each have a weight-measuring capacity of about 10,000 lb. (i.e., a 5:1 ratio of sensor capacity to bed-load capacity). As such, the weight-measuring system 510 is robust enough to withstand rapid weight and force changes of the bed load, which are often brought about by fast dumping, rough terrain encountered in off-road navigation, and elevated speeds.

The sensor(s) 512 might include other specifications such as meeting IP67 standards and having components with high immunity to shock. In addition, the sensor(s) 512 might be approved to OIML, TEP and NTEP standards for certification, and if desired, for environments that are subject to EEx is IIC T6 level of European approval. For example, the sensor(s) 512 might be constructed to be suitable for use in environments in which alternative methods involving gas or diesel are not feasible or advisable, or in which conditions exist having concentrations of flammable gases, vapors, or dusts. Nickel plating and/or stainless steel and full environmental sealing can also help to provide long term reliability and ruggedness in harsh or corrosive environments. The sensor(s) also preferably have a low profile for coupling in limited-space arrangements. Moreover, the sensor(s) might be hermetically sealed against moisture, and provided with shielded cables to provide operability in harsh environments. Although described with respect to the sensor(s), these features and/or characteristics might be common to one or more other components identified in FIG. 5.

Figure 3:
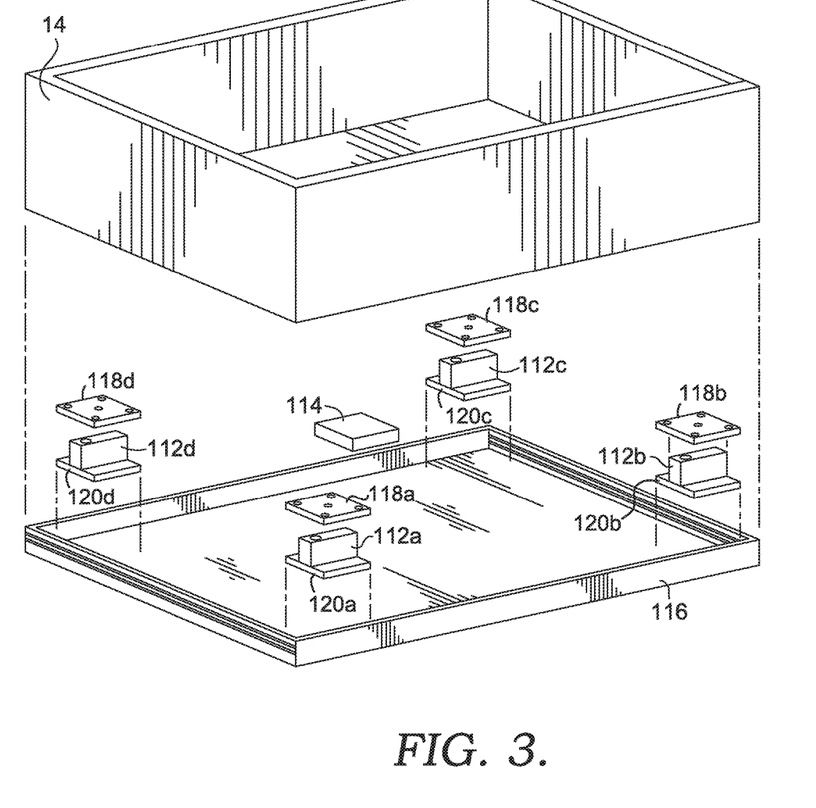
FIG. 3 depicts an exploded view of a bed and some components of a weight-measuring system in accordance with an embodiment of the present invention.

In a further aspect, the weight-measurement system 512 includes four sensors positioned at various locations under the bed 14. For instance, FIG. 3 depicts one of the sensors 112a-d positioned near each corner of the bed 14. Among other benefits, positioning sensors in this manner can increase the accuracy of the weight determination in certain circumstances, such as when the load being weighed is deflected and/or if the load is not centered within the bed 14 (i.e., positioned at one end of the bed 14 or along a side of the bed 14).

In one aspect in which the weight-measuring system includes a plurality of weight sensors 512, each sensor communicates a respective measured weight amount to a summing module 520 (e.g., summing load-cell junction box, "J-box," and the like), which determines an aggregate weight amount. The aggregate weight amount can then be used by the weight evaluator 516 to assess whether an output should be generated, and if so, what type of output. The summing module 520 might operate in various manners, and in one instance, the summing module 520 includes an active summing junction circuit, which accepts inputs from the plurality of weight sensors 512. The summing module can then apply individual gain adjustments to each respective weight amount before combining them to provide a calibrated and summed output.

The weight-measuring system 510 also includes a tilt sensor 514 (indicated by reference number 114 in FIG. 3). Generally, a tilt sensor 514 can measure titling in at least two axes of a reference plane (e.g., the earth's ground), and often a tilt sensor utilizes more than two axes. For instance, when affixed to the bottom of the bed 14, the tilt sensor 114 can measure tilt forward, rearward, and to either side of the vehicle, such as when the vehicle is on uneven and/or sloped ground. Exemplary types of tilt sensors include a microelectromechanical-system (MEMS) device, as well as an electrolytic device, or a combination of these systems.

Tilt sensors can operate in various manners. For example, some electrolytic-type tilt sensors include three electrodes: a common electrode and two outer electrodes. As the sensor is tilted, the electrolytic fluid inside the sensor covers more or less of the outer electrodes, depending on the direction of tilt. The tilt can be calculated by measuring the difference in electrical impedance between the two outer electrodes to the common, which can be converted to an angle measurement or a null or level position with reference to gravity. The electrolytic tilt sensor generally provides an output voltage that is proportional to the tilt angle. Other components, such as a micro-controller might be used to convert the output to a usable format. In an aspect of the present invention, in which one function is to account for a load in a cargo bed off-centered to one side, a single-axis, horizontal, banana-type level could be used. These types of levels typically have sensitivities of less than an arc second with a range of a few degrees.

In a further aspect, upon determining the orientation or tilt (e.g., degrees, arc minutes, or arc seconds) by the tilt sensor 516, the output (e.g., angle) can be communicated to the tilt compensator 518. In one aspect, the tilt compensator 518 combines a weight amount (e.g., provided by the summing module or by one or more sensors 512) with the tilt measurement to determine a tilt-compensated weight amount. For example, the tilt compensator 518 might apply a lookup function in order to determine the tilt-compensated weight amount or might apply a mathematical function to the tilt measurement and the one or more weight amounts. Various operations can then be taken based on the tilt-compensated weight amount.

As previously indicated, the weight evaluator 516 includes components that receive the aggregate weight amount and the tilt measurement, which are evaluated to determine whether an output should be provided. For example, the weight evaluator might determine that an indication of the calculated weight amount and the position of the load should be provided (e.g., by way of the display). However, various other types of alerts and messages can be output. For example, the weight evaluator might include a computing application 530 for processing the received inputs and applying an algorithm to the inputs. In addition, the weight evaluator 516 might include stored information 532 (e.g., lookup table) that can be compared to the received inputs to determine what type of indication to provide, such as a bed load capacity.

The weight-measuring system 510 may also include an output 522, such as a display 524, a light source 526 (e.g., LED), and a speaker (e.g., 528) for presenting the indication generated by the weight evaluator. Referring to FIG. 1, in one aspect the output device 22 is positioned near the forward end of the bed, which can improve the visibility and/or audibility of the output when a user is standing near the rear of the bed for loading purposes. For instance, the output device 22 might be coupled to a rear portion of the bad or to a portion of the bed. However, the output device 22 might be arranged in other portions of the vehicle, such as in the cab 12. In addition, the vehicle might include a plurality of output devices that are arranged in different locations on the vehicle, such as in the cab and near the bed. Output devices 22 might also be positioned remotely to facilitate remote monitoring of vehicle operation.

As such, the weight evaluator 516 can function together with the output device 522 to provide various alerts conveying different messages. For instance, where a load-capacity limit has been stored to the system, the weight evaluator can compare (using application 530) a calculated weight amount (e.g., based on input from sensors 512 and 514) to the load-capacity limit (e.g., stored in 532). In scenarios in which the calculated weight amount does not exceed the load-capacity limit, an approval message might be conveyed indicating that the load is below a suggested maximum limit. Exemplary approval messages include a green light, a text indication, an audible chime, and the like. In addition, a lack of any perceivable alert might be interpreted as an approval for some applications.

In a further embodiment, the system can compare the calculated weight amount to the load-capacity limit to determine when the calculated weight amount is less than the load-capacity limit, but is within a desired range or amount of the load-capacity limit. In such a scenario, a message or indication might be presented that indicates the weight of the load is getting close to the load-capacity limit, such as a yellow light or other indication that can be interpreted as such.

In yet another aspect, the system can compare the calculated weight amount to the load-capacity limit to determine when the calculated weight amount exceeds the load-capacity limit, in which case a message could be conveyed indicating that the load weight amount has exceeded a pre-determined maximum weight, which could be factory set or user customizable. Exemplary messages or outputs might include a red light, a text indication, an audible siren, as well as a disabling of certain operations. For instance, if a bed is positioned in a ground-level, loading position, and a determination is made that a calculated weight amount of a load in the bed exceeds a load capacity of the bed, the translating mechanism might be disabled to prevent the bed from being lifted off of the ground and onto the vehicle. In another example, driving operations of the vehicle might be disabled.

In a further aspect, measured angles (from the tilt sensor), measured weight amounts, and calculated weight amounts might be time-stamped and stored in data storage 532. Likewise, a record of each output might also be stored in data storage 532. These historical data points and historical outputs might be stored in a manner that is sortable by time, date, location, operator, and various other criteria. In addition, these data items can be retrieved for subsequent review. For instance, anytime a vehicle requires servicing for maintenance, or otherwise, it might be helpful to review any historical weight amounts, operating tilt angles, or messages to determine whether the vehicle was being operated consistent with certain vehicle recommendations.

Having described one exemplary weight-measuring system 510, reference is now made to FIG. 3, in which some exemplary components of a weight-measuring system are illustrated in relation to the bed 14. Although FIG. 3 omits various parts of the vehicle 10, the bed 14, and the weight-measuring system 510 in order to simplify the illustration, it is to be understood that the bed, vehicle, and weight-measuring system might include other elements not depicted in FIG. 3.

In one aspect, the weight-measuring system includes a plurality of sensors 112*a-d* and 114 that are coupled underneath the bed 14 and are supported by a protective cover 116. The protective cover 116 is also coupled to the sensors 112*a-d* to support the weight-measuring system against an underlying surface (e.g., a vehicle frame member, translating frame component, and/or the ground surface) and to protect the weight-measuring system from environmental elements (e.g., moisture, extreme temperatures, dirt, sunlight, etc.). To further illustrate this aspect, FIG. 1 includes a cutout region 18 on the side of the protective cover 116 and the cutout region is illustrated in an enlarged view in FIG. 4. FIG. 4 depicts the sensor 112 coupled underneath the bed 14 and in the space between the bed 14 and the protective cover 116. In addition, the cover 116 supports the sensor 112 on a vehicle frame member 20. Likewise, in FIG. 2 the protective cover 116 again supports the weight-measuring system on the vehicle frame 20 when the bed is at ground-level in a loading position.

FIG. 3 depicts a pan-style protective cover 116 that encases all of the sensors 112a-d. But in other aspects, the protective cover 116 might include a set of separate protective covers, each of which is designed and sized to encase a single of the sensors 112a-d. Even when the single-sensor protective covers are utilized, the covers still support the weight-measuring system (i.e., sensors) against an underlying surface in both the transporting mode and the loading mode.

In a further aspect, each sensor 112a-d is mounted to an underneath side of the bed 14 by an upper mounting plate 118a-d and is mounted to the protective cover by a lower mounting plate 120a-d. For example, the mounting plates might be affixed to each sensor and mechanical fasteners (e.g., bolt) might be secured through the plates and the bed and protective cover. In one embodiment, the upper mounting plate 118a-d includes a plate thickness that is thicker than a sheet thickness of the bed. Providing a thicker mounting plate 118a-d can help to dampen bounce and fluctuations caused by the load (e.g., vehicle traversing uneven or rough terrain). In one embodiment, a ratio of the plate thickness of the mounting plate to a sheet thickness of the bed is at least about 3.5 to 1. For example, the sheet thickness might be 19 ga (0.418"), whereas the plate thickness might be 9 ga (0.1495" or thicker).

In accordance with an aspect of the present invention, the weight-measuring system is a complete system that is independent of the vehicle. That is, the system includes the necessary sensors, hardware components, software components, mounting components, cables, and the like, independent of the vehicle. As such, the weight-measuring system can be provided as a retrofit option for existing vehicles and can also be installed on a new vehicle during assembly.

Figure 6:
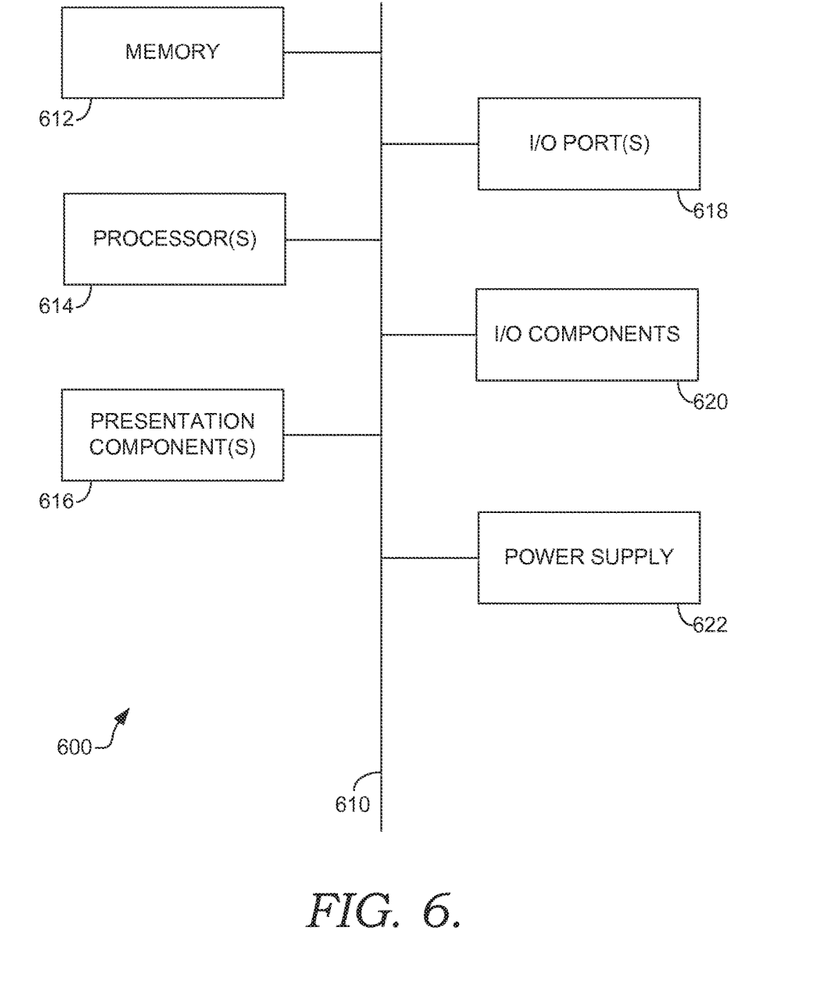
FIG. 6 depicts an exemplary computing environment in accordance with an embodiment of the present invention.

One or more components of the weight-measuring system might include parts of a computing device. Referring to FIG. 6, an exemplary operating environment for implementing embodiments of the present invention is shown and designated generally as computing device 600. Computing device 600 is but one example of a suitable computing environment and is not intended to suggest any limitation as to the scope of use or functionality of invention embodiments. Neither should the computing environment 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention.

Computing device 600 typically includes a variety of computer storage devices. By way of example, and not limitation, computer storage devices may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or other non-transitory mediums that can be used to encode desired information and be accessed by computing device 600.

Memory 612 includes a computer storage device in the form of volatile and/or nonvolatile memory. The memory may be removable, nonremovable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc. I/O ports 618 allow computing device 600 to be logically coupled to other devices including I/O components 620, some of which may be built in.

In the context of the weight-measuring system 510, one or more computing devices was described having some or all of the components identified in the description of FIG. 6. For instance, each of the sensors might be coupled with a processor (e.g., microprocessor, micro-controller, etc.) for translating detected information. In addition, the weight evaluator 516 might likewise have a processor for performing computer-executable instructions 530, which might be stored in data store 532. Further, the output device 522 represents a type of I/O component 620 and/or presentation component 616.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed:

1. A weight-measuring system for a translating utility-vehicle bed having a load surface, the system comprising:
one or more weight sensors coupled to the translating utility-vehicle bed beneath the load surface and above a sensor base and each of the one or more weight sensors configured to measure at least a portion of a weight amount of a load positioned on the load surface, each of the one or more weight sensors being operable to output a respective measured weight amount when the translating utility-vehicle bed is in a transportation position and in a translated ground-level loading position, wherein the one or more weight sensors and the sensor base each follow the translating utility-vehicle bed between the transportation and the translated ground level loading positions;
a tilt sensor operable to measure an angular orientation of the weight-measuring system and to output a detected angular orientation, wherein the tilt sensor follows the translating utility-vehicle bed between the transportation and the translated ground level loading positions; and
a weight-computing device that determines a tilt-compensated weight amount based on the respective measured weight amounts and the detected angular orientation.

2. The system of claim 1, wherein the one or more weight sensors include one or more load cells.

3. The system of claim 2, wherein the one or more load cells include a hydraulic load cell, a pneumatic load cell, a strain-gauge load cell, or a combination thereof.

4. The system of claim 2, wherein the one or more load cells each include a load-cell capacity rating, wherein the system is installable on a utility-vehicle bed having a load-capacity weight amount, and wherein a ratio of the load-cell capacity rating to the load-capacity weight amount is about five to one.

5. The system of claim 1, wherein the tilt sensor measures the angular orientation of the weight-measuring system with respect to at least a first axis and a second axis, which create a set of quadrants, and wherein the one or more weight sensors include at least four weight sensors, each of which is positioned in a respective quadrant.

6. The system of claim 1, wherein the system includes at least two weight sensors, and wherein the system further comprises a summing module that receives the respective measured weight amount from each of the weight sensors and that calculates an aggregated weight amount, which is communicated to the weight-computing device.

7. The system of claim 1, wherein the tilt sensor includes an electrolytic tilt sensor, a micro-electromechanical sensor, or a combination thereof.

8. The system of claim 1 further comprising, one or more damping plates, each of which is coupled to a bed-facing portion of a respective weight sensor to interface between the respective weight sensor and the translating utility-vehicle bed.

9. The system of claim 8, wherein the one or more damping plates include a plate thickness and the translating utility-vehicle bed includes a base having a sheet thickness, and wherein a ratio of the plate thickness to the sheet thickness is at least about 3.5 to 1.

10. A utility-vehicle comprising:
a vehicle frame mounted to a drive chassis, the drive chassis configured to drive the utility-vehicle over a ground surface;
a bed having a load surface positioned above a mounting plate, the bed coupled to the vehicle frame by a bed-translating system, the bed-translating system connected to the mounting plate, the-bed translating system configured to move the bed relative to the frame between a transporting position where the bed is positioned over a portion of the vehicle frame and above the drive chassis and a loading position where the bed is positioned behind a rear end of the vehicle frame and proximate the ground surface;
a weight-measuring system coupled between the load surface of the bed and the mounting plate and configured to detect a weight amount of a load applied to the bed, the weight-measuring system including one or more load sensors positioned beneath the load surface of the bed and above the mounting plate; and
a tilt sensor coupled to the bed to measure an angular orientation of the bed relative to the ground surface.

11. The vehicle of claim 10, wherein the one or more load sensors are operable to measure the weight of the load on the load surface when the bed is in the transporting position, when the bed is in the loading position, and when the bed is in any position in between the transporting position and the loading position.

12. The system of claim 1, wherein each of the one or more weight sensors is operable to output a respective measured weight amount when the translating utility-vehicle bed is in a tilted dump position.

13. The vehicle of claim 10, wherein the bed-translating system comprises a pair of linkages, wherein each linkage of the pair of linkages comprise:
a first link pivotally coupled to the vehicle frame, a second link pivotally coupled to the mounting plate, and one or more links pivotally coupled between the first link and the second link.

* * * * *